(12) United States Patent
Kolych et al.

(10) Patent No.: US 12,039,397 B2
(45) Date of Patent: Jul. 16, 2024

(54) SYSTEMS, METHODS, AND DEVICES FOR WIRELESS COMMUNICATION DEVICE-BASED DETECTION OF RADIO FREQUENCY IDENTIFICATION DEVICES

(71) Applicant: Cypress Semiconductor Corporation, San Jose, CA (US)

(72) Inventors: Igor Kolych, Lviv (UA); Kiran Uln, Pleasanton, CA (US); Oleksandr Karpin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/954,101

(22) Filed: Sep. 27, 2022

(65) Prior Publication Data
US 2024/0104315 A1   Mar. 28, 2024

(51) Int. Cl.
*G06K 7/10*     (2006.01)
*G06K 19/077*   (2006.01)
*H04W 88/06*    (2009.01)

(52) U.S. Cl.
CPC ..... *G06K 7/10297* (2013.01); *G06K 7/10366* (2013.01); *G06K 19/07766* (2013.01); *H04W 88/06* (2013.01)

(58) Field of Classification Search
CPC .......... G06K 7/10297; G06K 7/10366; G06K 19/07766
USPC ........................................................ 235/451
See application file for complete search history.

(56) References Cited

U.S. PATENT DOCUMENTS

| | | | |
|---|---|---|---|
| 7,205,931 B2* | 4/2007 | Gila ...................... | G01S 13/348 342/194 |
| 2007/0001814 A1* | 1/2007 | Steinke ................ | G06K 7/0008 340/10.31 |
| 2008/0143584 A1* | 6/2008 | Shoarinejad .......... | G01S 13/751 342/127 |
| 2010/0109903 A1* | 5/2010 | Carrick ................ | G06K 7/0008 340/8.1 |

* cited by examiner

*Primary Examiner* — Ahshik Kim (57) ABSTRACT

Systems, methods, and devices detect radio frequency identification devices. Methods include transmitting a signal from a transmitter of a wireless device compatible with a wireless communications protocol, receiving, using a receiver of the wireless device, an encoded signal from a radio frequency identification (RFID) device, and determining a plurality of data values based, at least in part, on the received encoded signal. Methods further include generating an estimated distance value based, at least in part, on the received encoded signal, the estimated distance value representing an estimate of a distance between the wireless device and the RFID device.

19 Claims, 9 Drawing Sheets

SYSTEMS, METHODS, AND DEVICES FOR WIRELESS COMMUNICATION DEVICE-BASED DETECTION OF RADIO FREQUENCY IDENTIFICATION DEVICES

TECHNICAL FIELD

This disclosure generally relates to radio frequency identification devices, and more specifically, to wireless detection of such radio frequency identification devices using communication devices.

BACKGROUND

Radio frequency identification (RFID) devices may be configured to provide one or more identifiers using radio frequency (RF) signals. Such RFID devices may be passive RFID devices, such as RFID tags, that reflect RF signals to convey such identifiers via particular aspects of the backscattering of the signal. Scanning devices may receive such backscattered signals and extract identifying information from the backscattered signal. However, conventional scanning devices remain limited because they require single purpose scanners utilizing large excitation power for operation. Such scanners require additional hardware, resources, and cost. Accordingly, conventional scanning devices remain limited because they are not able to efficiently enable communication with RFID devices.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Passive RFID devices, such as RFID tags, may be configured to be compatible with dedicated RFID scanners that may include a waveform generator, a power splitter, and a transmission and reception antenna. Such RFID scanners are configured to RFID scanning, but do not support other functionalities. Accordingly, the use of such a dedicated scanner requires the implementation of separate and dedicated scanning equipment to scan RFID tags, thus increasing resource costs associated with RFID scanning.

Embodiments disclosed herein scan RFID devices, such as passive RFID tags, using transceivers included in a wireless device. More specifically, wireless devices that may be configured to perform wireless communications operations, such as data transmission and reception, and may also be configured to perform RFID scanning operations as well as one or more security operations, such as distance estimation. Moreover, wireless devices disclosed herein may be further configured to toggle between wireless communications and scanning functionalities. Accordingly, as will be discussed in greater detail below, wireless devices disclosed herein may be configured to transition between wireless communications and scanning functionalities to provide seamless implementation of both functionalities using existing collocated transceivers in the wireless device. Accordingly, such RFID scanning may be performed without the use of a dedicated scanner, thus reducing the resource costs associated with such scanning functionalities.

Figure 1:
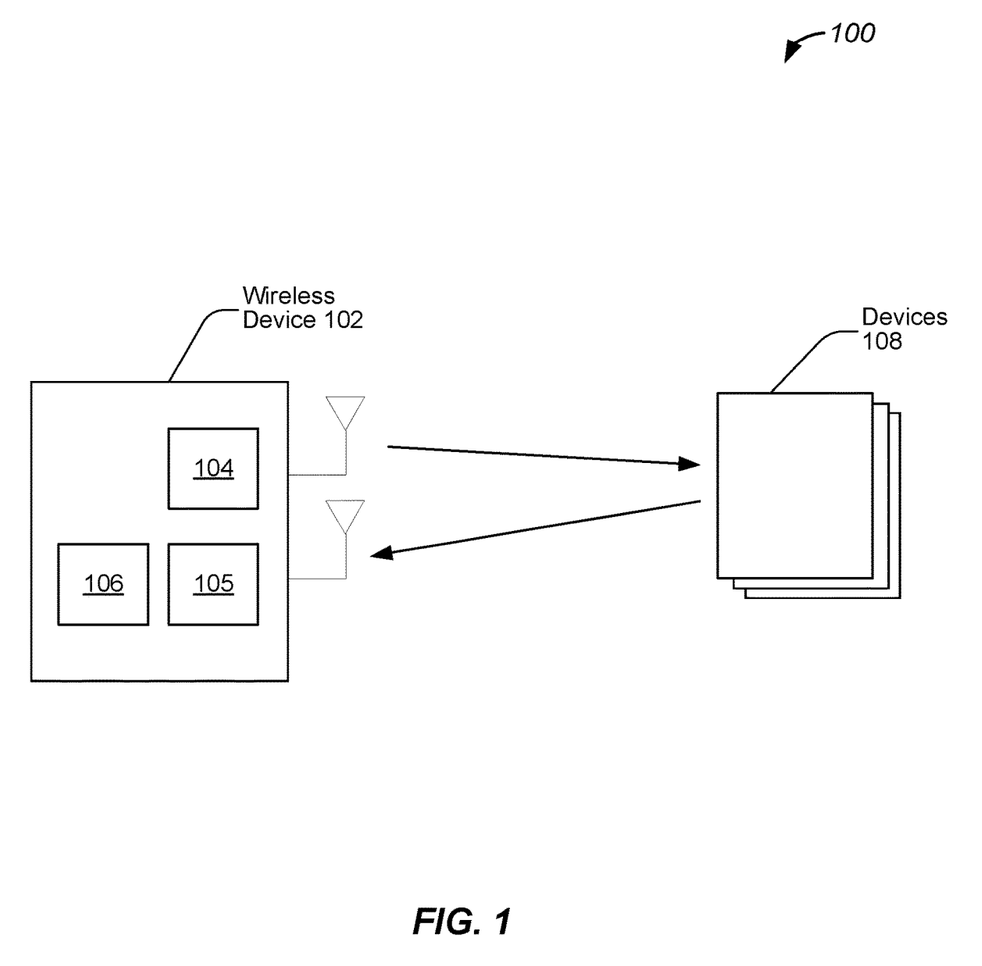
FIG. 1 illustrates an example of a system for radio frequency identification device detection, configured in accordance with some embodiments.

FIG. 1 illustrates an example of a system for radio frequency identification device detection, configured in accordance with some embodiments. Accordingly, a system, such as system 100, may include wireless devices that are used for wireless communications, and are also configured to be able to perform detection and identification operations. Accordingly, as will be discussed in greater detail below, wireless devices included in system 100 may be configured to toggle between communications operations and RFID operations, thus enabling a wireless communications radio to be used for both sets of operations, and also allowing such operations to be seamlessly interleaved.

In some embodiments, system 100 includes wireless device 102 which is configured to transmit and receive wireless signals in accordance with one or more communications protocols. For example, wireless device 102 may include one or more transceivers, such as transceiver 104 and transceiver 105, which are configured to transmit and receive signals in accordance with a wireless communications protocol, such as one compatible with an IEEE 802.11 standard. In one example, such a wireless communications protocol may be a Wi-Fi protocol. In various embodiments, wireless device 102 additionally includes a processing device, such as processing device 106, which is configured to implement various hardware and logic associated with transceiver 104 and the wireless communications protocol. For example, processing device 106 may be configured to implement a medium access control (MAC) layer that is configured to control hardware associated with a wireless transmission medium, such as that associated with a Wi-Fi transmission medium. Accordingly, wireless device 102 is configured transmit wireless signals via one or more antennas, and also receive signals via the one or more antennas.

System 100 additionally includes one or more devices, such as device 108. As will be discussed in greater detail below, device 108 may be an RFID device that is configured to reflect and modulate a received signal based on one or more designated parameters. For example, device 108 may be a passive RFID device that is configured to modulate a received signal in accordance with one or more designated modulation parameters. In one example, device 108 may be configured to extract RF energy received from a signal from wireless device 102, and to use the extracted RF energy to modulate the signal in a time domain. Accordingly, device 102 may include a modulator powered by such extracted RF energy, and configured to temporally modulate a received signal in accordance with the modulation parameters. Thus, according to various embodiments, such a temporally modulated signal may also be referred to herein as a modulated signal.

In some embodiments, such modulation parameters may identify how device 108 is configured to reflect or backscatter a designated set of frequencies, and thus filter a reflected signal to encode one or more data values that may be, for example, an identifier for device 108. For example, device 108 may be configured to have a physical geometry that filters the reflected signal by reflecting a first set of frequencies, and not reflecting a second set of frequencies. Thus, according to various embodiments, such a backscattered signal generated in accordance with such filtering may also be referred to herein as a filtered signal.

As will be discussed in greater detail below, wireless device 102 may be configured to utilize wireless communications signals to perform RFID detection and identification operations for device 108. For example, wireless device 102 may use a Wi-Fi transceiver to perform such perform RFID detection and identification operations. In this way, wireless device 102 may use components of a Wi-Fi radio, such as a Wi-Fi transceiver, to toggle between communications operations and RFID detection and identification operations. Additional details regarding such operations are discussed in greater detail below.

Figure 2:
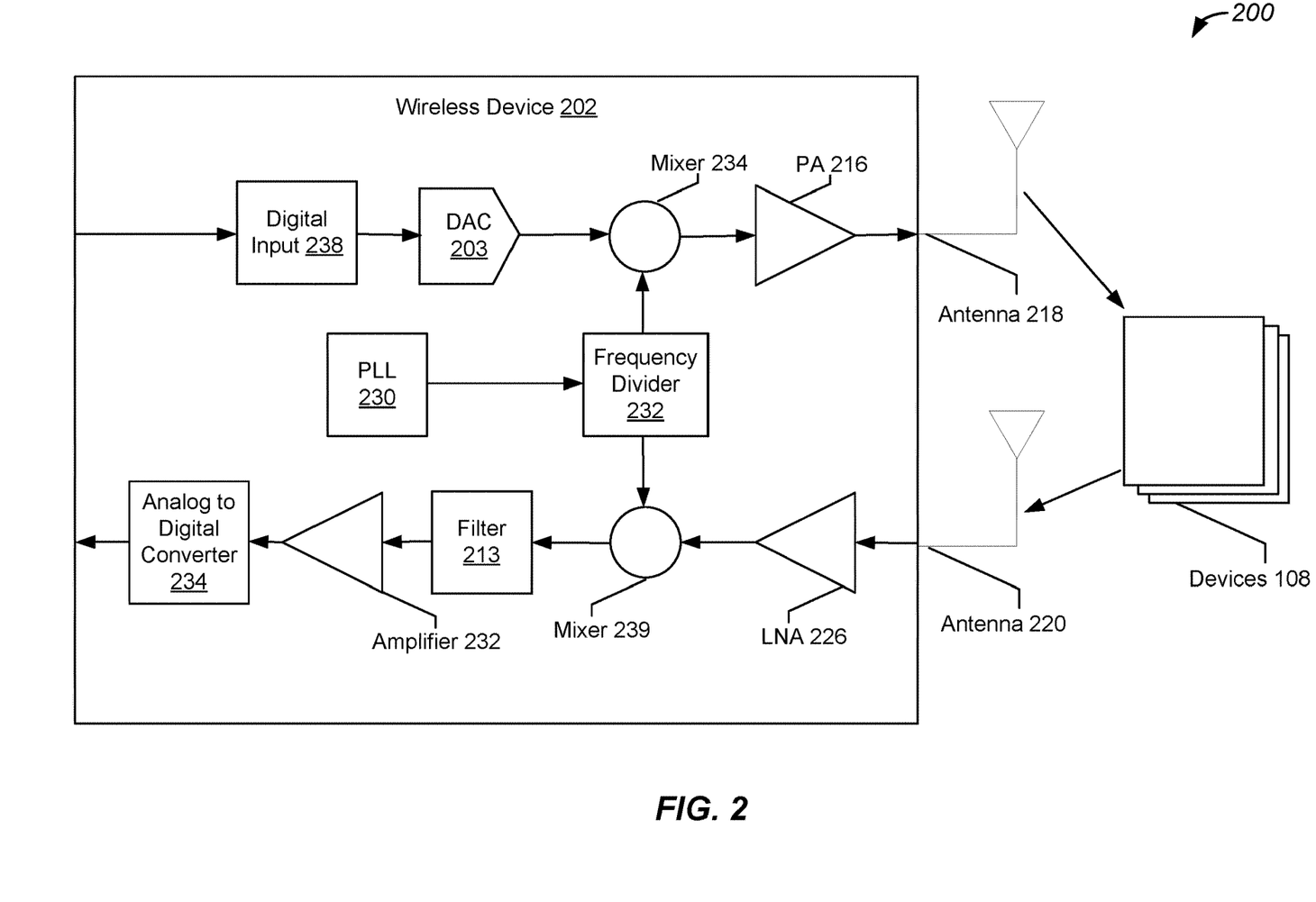
FIG. 2 illustrates an example of another system for radio frequency identification device detection, configured in accordance with some embodiments.

FIG. 2 illustrates an example of another system for radio frequency identification device detection, configured in accordance with some embodiments. As similarly discussed above, a system, such as system 200, may include wireless devices that are used for wireless communications, and are also configured to be able to perform detection and identification operations. Accordingly, as will be discussed in greater detail below, wireless devices included in system 200 may be configured to enable seamless interleaving of communications operations and RFID operations.

As similarly discussed above, system 200 may include a wireless device, such as wireless device 202 that is configured to transmit and receive data in accordance with one or more wireless communications protocol. Accordingly, wireless device 202 may include digital input 238 which may provide digital data to be transmitted. Such data may be received from other components of wireless device 202, such as a first transceiver generating a data stream in accordance with a wireless communications protocol, such as a Wi-Fi protocol. An output of digital input 238 may be provided to digital to analog converter (DAC) 203, and then to power amplifier (PA) 216 via mixer 234 for transmission via antenna 218. In some embodiments, digital input 238, DAC 203, mixer 234, and PA 216 are part of a transmit chain included in the first transceiver.

Wireless device 202 may also include one or more components for receiving signals. For example, a signal may be received via antenna 220, provided to low noise amplifier 226, then provided to mixer 239, and provided to filter 213. As will be discussed in greater detail below, mixer 239 may be configured to remove generated signal components from the received signal. Accordingly, mixer 239 may be configured to perform signal subtraction, and may subtract out the transmitted signal via a feedback path implemented in wireless device 202. In various embodiments, filter 213 may be a low pass filter that then provides a signal to amplifier, 232, and to analog to digital converter (ADC) 234. ADC 234 may then provide the received signal to a second transceiver. In some embodiments, low noise amplifier 226, mixer 239, filter 213, amplifier 232, and analog to digital converter 234 are part of a receive chain included in the second transceiver.

As similarly discussed above, RFID devices, such as device 108, are configured to reflect a signal in accordance with one or more modulation parameters. Accordingly, device 108 may introduce time modulation into a reflection of a signal. More specifically, wireless device 202 may transmit a signal as discussed above, and device 108 may reflect the signal back to wireless device 202 after being modulated in accordance with modulation parameters. In this way, the first transceiver may be configured to transmit a signal, and the second transceiver may be configured to receive a modulated signal. As will be discussed in greater detail below, wireless device 202 may be configured to extract data values based on such modulation, and perform one or more RFID operations based on such modulation. More specifically, wireless device 202 may be configured to determine identifiers and additional useful information (such as one or more measurements) of device 108. Moreover, wireless device 202 may also be configured to determine an estimate of a distance to device 108. As also shown in FIG. 2, wireless device 202 may also include a phase locked loop circuit such as PLL 230 coupled to frequency divider 232.

Figure 3:
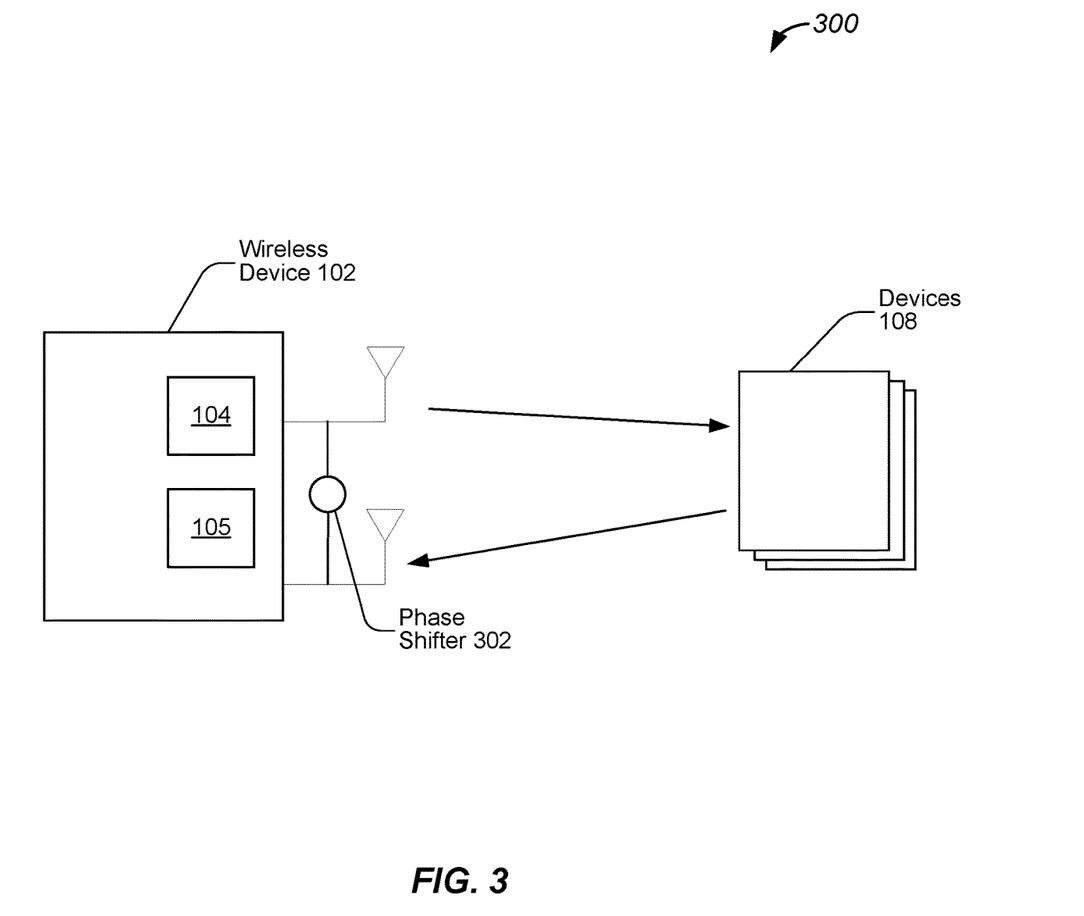
FIG. 3 illustrates an example of an additional system for radio frequency identification device detection, configured in accordance with some embodiments.

FIG. 3 illustrates an example of an additional system for radio frequency identification device detection, configured in accordance with some embodiments. As similarly discussed above, a system, such as system 300, may include wireless devices that are used for wireless communications, and are also configured to be able to perform detection, identification, and data extraction operations. Accordingly, as similarly discussed above, system 100 may include wireless device 102 that may include transceiver 104 and transceiver 105. System 100 may also include various RFID devices, such as device 108.

In various embodiments, system 300 additionally includes phase shifter 302 which is configured to remove parasitic signals that may otherwise affect a received signal. For example, a parasitic signal may result from the signal transmitted from a first antenna of wireless device 102 being received at a second antenna of wireless device 102. Such a signal may interfere with a reflected signal received from device 108. Accordingly, phase shifter 302 may be coupled between a transmit antenna and a receive antenna in a feedback path between the two, and phase shifter 302 may be configured to perform an amplitude match-based phase shift to counteract the parasitic signal. In this way, phase shifter 302 may be configured to reduce and/or remove a parasitic signal and increase the accuracy of signal measurements made by wireless device 102. In various embodiments, phase shifter 302 may be configured to have an operational range determined based on an operational range of transceiver 104 and transceiver 105. For example, phase shifter 302 may be configured to have an operational range determined to be channels 2, 4, 5, and 6 GHz for transceiver 104 and transceiver 105 which may be configured to be compatible with an IEEE 802.11 standard. In some embodiments, phase shifter 302 may use a different RF circuit to couple to the two transceivers. In some embodiments, the RF circuit may be two couplers implemented between microstrip lines.

Figure 4:
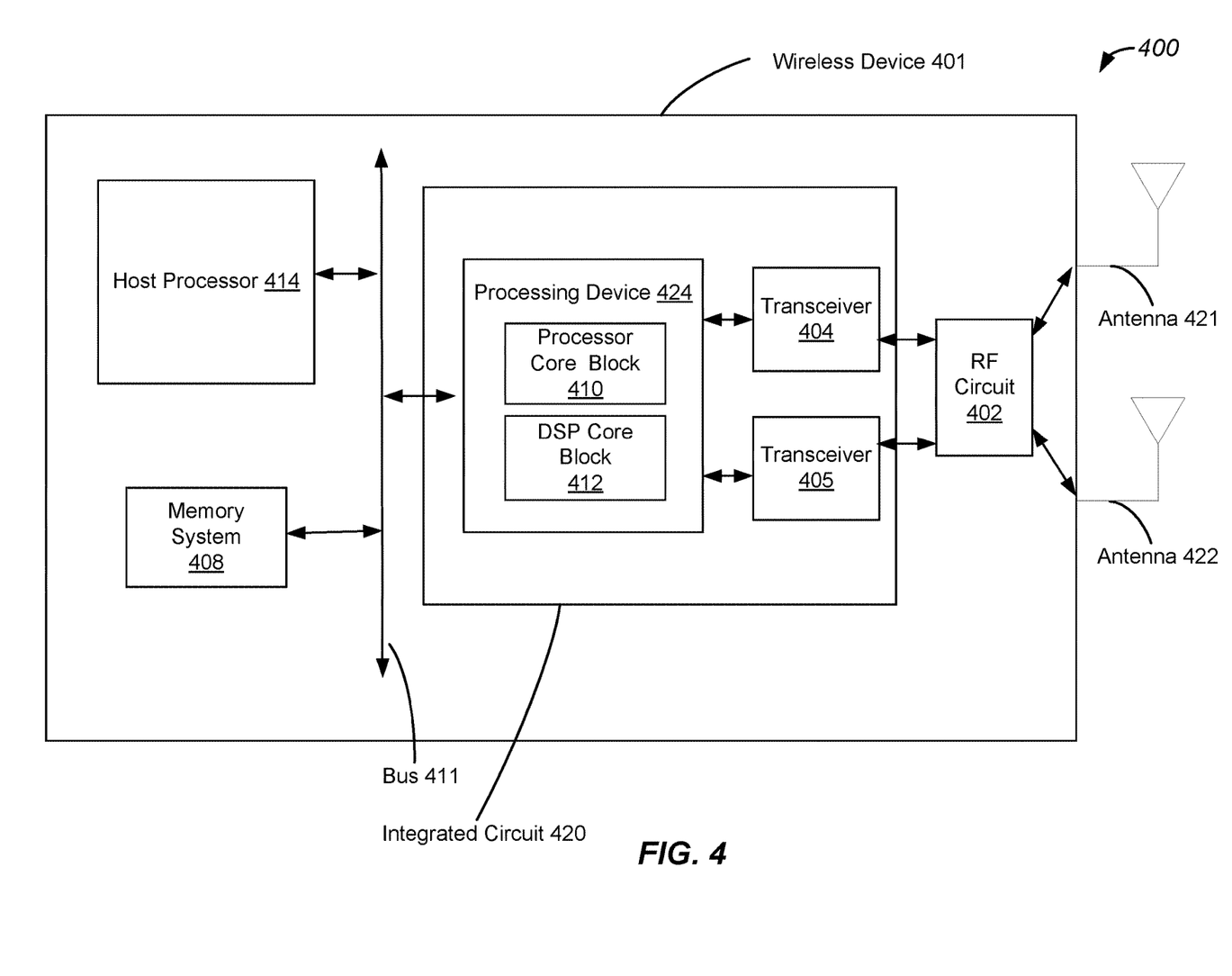
FIG. 4 illustrates an example of a device for radio frequency identification device detection, configured in accordance with some embodiments.

FIG. 4 illustrates an example of a device for radio frequency identification device detection and communication, configured in accordance with some embodiments. More specifically, FIG. 4 illustrates an example of a system, such as system 400, that may include wireless device 401. It will be appreciated that wireless device 401 may be one of any of the wireless devices discussed above with reference to FIGS. 1, 2, and 3, such as wireless device 102 and wireless device 202.

In various embodiments, wireless device 401 includes one or more transceivers, such as transceiver 404 and transceiver 405. In one example, system 400 includes transceiver 404 which is configured to transmit and receive signals using a communications medium that may include antenna 421 or antenna 422. As noted above, transceiver 404 may be a Wi-Fi transceiver. Accordingly, transceiver 404 may be compatible with a Wi-Fi communications protocol, such as an IEEE 802.11 protocol. In various embodiments, transceiver 404 includes a modulator and demodulator as well as one or more buffers and filters, that are configured to generate and receive signals via antenna 421 and/or antenna 422.

System 400 additionally includes transceiver 405 which may be collocated with transceiver 404 in wireless device 401. In various embodiments, transceiver 405 is also be configured to transmit and receive signals using a communications medium that may include antenna 421 or antenna 422. Accordingly, transceiver 405 may be also Wi-Fi transceiver compatible with an IEEE 802.11 protocol. Moreover, transceiver 405 includes a modulator and demodulator as well as one or more buffers and filters, that are configured to generate and receive signals via antenna 421 and/or antenna 422. While various embodiments are described with reference to a Wi-Fi communications protocol, it will be appreciated that any suitable protocol may be used. For example, the transceivers 404 and 405 may be compatible with a Bluetooth protocol or a Bluetooth Low Energy (BLE) protocol.

In various embodiments, transceivers 404 and 405 may be configured to perform the RFID scanning and distance estimation operations discussed above and discussed in greater detail below. In one example, transceiver 404 may be configured as a transmitter, and transceiver 405 may be configured as a receiver. Accordingly, as will be discussed in greater detail below, signals may be transmitted from transceiver 404, reflected off of an RFID device, and received at transceiver 405. Moreover, transceivers 404 and 405 may toggle between such RFID scanning and distance estimation operations, and wireless communications operations such as data packet transmission and reception. In this way, transceivers 404 and 405 and their associated processing logic may be configured to seamlessly transition between such functionalities.

In various embodiments, system 400 further includes one or more processing devices, such as processing device 424 which may include logic implemented using one or more processor cores. Accordingly, processing device 424 is configured to implement logic for RFID scanning and distance estimation operations, as will be discussed in greater detail below. For example, processing device 424 may be configured to perform signal generation and sampling operations for RFID scanning, as well as distance estimation calculations. Accordingly, processing device 424 includes processing elements configured to perform the RFID scanning and distance estimation operations that will be described in greater detail below.

Processing device 424 includes one or more components configured to implement a media access control (MAC) layer that is configured to control hardware associated with a wireless transmission medium, such as that associated with a Wi-Fi transmission medium. In one example, processing device 424 may include processor core block 410 that may be configured to implement a driver, such as a Wi-Fi driver. Accordingly, processing device 424 may include components associated with transceiver 404, such as MAC layers, packet traffic arbiters, and a scheduler. In various embodiments, processing device 424 may further include digital signal processor (DSP) core block 412 which may be configured to include microcode.

System 400 further includes radio frequency (RF) circuit 402 which is coupled to antenna 421 and antenna 422. In various embodiments, RF circuit 402 may include various components such as an RF switch, a diplexer, and a filter. Accordingly, RF circuit 402 may be configured to select an antenna for transmission/reception, and may be configured to provide coupling between the selected antenna, such as antenna 421 or antenna 422, and other components of system 400 via a bus, such as bus 411. While one RF circuit is shown, it will be appreciated that wireless device 401 may include multiple RF circuits. Accordingly, each of multiple antennas may have its own RF circuit. Moreover, each one may be associated with a particular wireless communications protocol, such as a first antenna and RF circuit for Wi-Fi and a second antenna and RF circuit for Bluetooth. Moreover, while FIG. 4 illustrates system 400 as having multiple antennas, it will be appreciated that system 400 may be implemented with a single antenna.

System 400 includes memory system 408 which is configured to store one or more data values associated with RFID scanning and distance estimation operations discussed in greater detail below. Accordingly, memory system 408 includes storage device, which may be a non-volatile random-access memory (NVRAM) configured to store such data values, and may also include a cache that is configured to provide a local cache. In various embodiments, system 400 further includes host processor 414 which is configured to implement processing operations implemented by system 400.

It will be appreciated that one or more of the above-described components may be implemented on a single chip, or on different chips. For example, transceiver 404, transceiver 405, and processing device 424 may be implemented on the same integrated circuit chip, such as integrated circuit chip 420. In another example transceiver 404, transceiver 405, and processing device 424 may each be implemented on their own chip, and thus may be disposed separately as a multi-chip module or on a common substrate such as a printed circuit board (PCB). It will also be appreciated that components of system 400 may be implemented in the context of a vehicle such as an automobile. Accordingly, some components, such as integrated chip 420, may be implemented in a first location, while other components, such as antenna 421 and/or antenna 422, may be implemented in second location, and coupling between the two may be implemented via a coupler.

Figure 5:
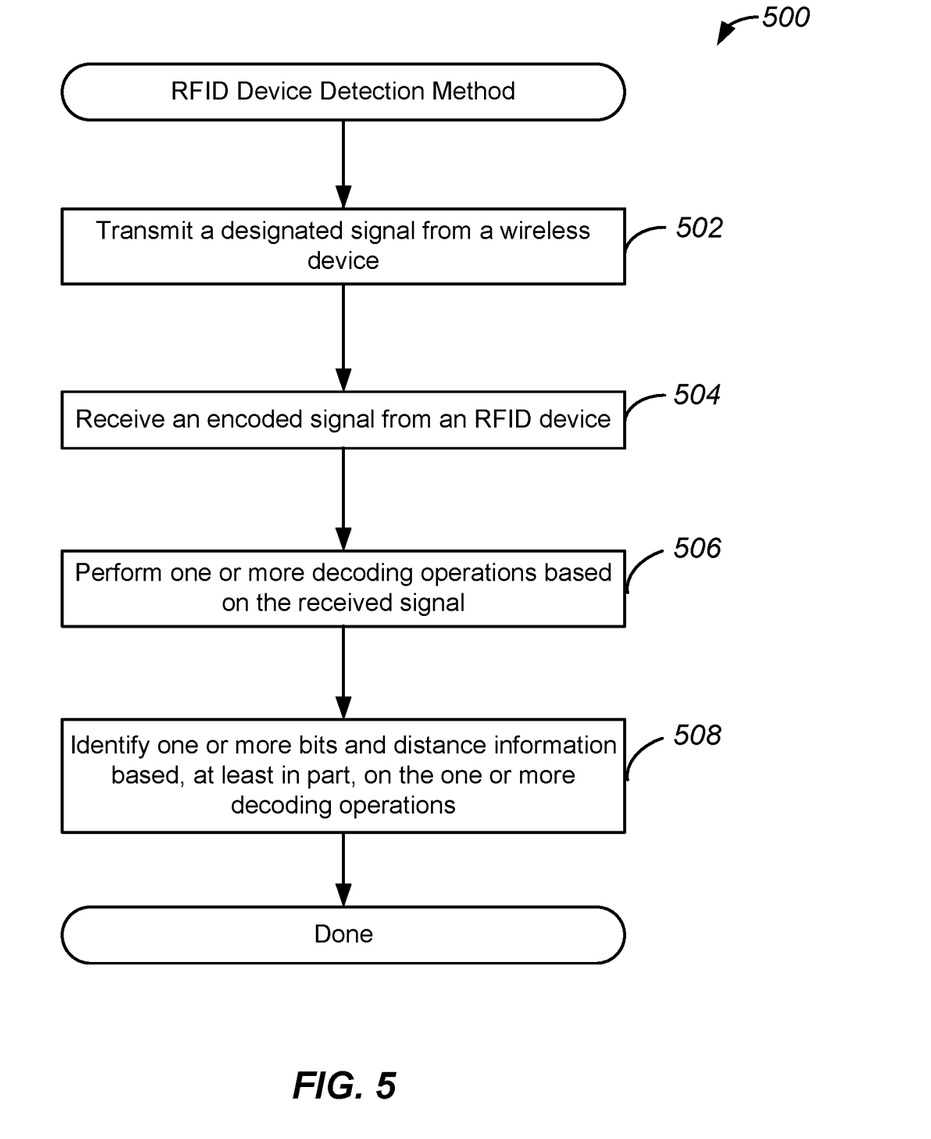
FIG. 5 illustrates a flow chart of an example of a method for radio frequency identification device detection, implemented in accordance with some embodiments.

FIG. 5 illustrates a flow chart of an example of a method for radio frequency identification device detection, implemented in accordance with some embodiments. As will be discussed in greater detail below, a method, such as method 500, may be performed to configure a wireless device to perform RFID device scanning and distance estimation operations. As similarly discussed above, the wireless device may be compatible with a wireless communications protocol, such as a Wi-Fi protocol, and transmit a signal using a Wi-Fi frequency range, receive a reflected signal from an RFID device, and perform one or more identification and distance estimate operations based on the received signal. In this way, a Wi-Fi wireless device may be configured to perform RFID scanning and distance estimation operations.

Method 500 may perform operation 502 during which a designated signal may be transmitted from a wireless device. As similarly discussed above, the designated signal may be a predetermined signal that has been defined by an entity, such as a manufacturer. Accordingly, the designated signal may be a defined or arbitrary data pattern configured to include a known data transmission having known frequency characteristics. Accordingly, during operation 502, a first transceiver of the wireless device may be configured as a transmitter, and may transmit the designated signal via a transmission medium.

Method 500 may perform operation 504 during which a signal including encoded information may be received from an RFID device. Accordingly, as similarly discussed above, the signal may be received at the RFID device, and the RFID device may reflect the signal with encoded information from the RFID device. As also discussed above, such encoded information may be determined based on frequency encoding, time domain encoding, or a combination of the two. In some embodiments, physical characteristics, such as a physical configuration and geometry, of the RFID device may be used for RFID encoding by filtering a reflected signal. Accordingly, the reflected signal may return the designated signal to the wireless device after encoding resulting from the reflection process. In various embodiments, the encoded information may be determined based on time-domain modulation generated based on harvested RF energy. In some embodiments, the encoded information may be determined based on a combination of time-domain modulation and signal reflection filtering.

Method 500 may perform operation 506 during which one or more decoding operations may be performed. Accordingly, a second transceiver of the wireless device may be configured as a receiver, and may receive the reflected signal from the RFID device. The second transceiver may perform one or more decoding operations to recover encoded data from the received signal. As will be discussed in greater detail below, such decoding operations may include obtaining a plurality of samples and performing one or more decoding operations. As will also be discussed in greater detail below, such decoding operations may include determining one or more changes between received and transmitted signals.

Method 500 may perform operation 508 during which one or more bits and distance information may be identified based, at least in part, on the one or more decoding operations. Accordingly, the received signal may be decoded to extract one or more data values from the received signal. Such data values may include bits of data and other portions of the reflected signal that may be used to identify distance information. As similarly discussed above, the encoding introduced by the RFID device may be time-based modulation, and the demodulation operations may be performed to, among other things, identify what time-based modulation has occurred as well as decode the transmitted bit stream included in the designated signal. In this way, the wireless device may identify the RFID device based on characteristics of encoded signal, as well as perform distance estimation computation based on timestamps and time-of-arrival computations associated with the received signal.

In various embodiments, information is extracted from the received signal by comparing transmitted and received signals and a known method or technique of encoding. More specifically, the transmitter may know the data pattern that was transmitted as well as an encoding scheme that was used. Changes may be identified based on such known information. For example, if a time domain-based modulation technique is used, such modulation may be performed via amplitude modulation of the reflected signal. Moreover, if frequency domain filtering is used, resonators may be configured to reflect specific frequencies, and changes in a received spectrum of reflected frequencies may be identified based on one or more fast Fourier transform (FFT) operations. In this way, information may be extracted from the received signal and used to identify what changes have been made to the signal, where such changes are represented using one or more of frequency filtering or time-domain modulation.

Figure 6:
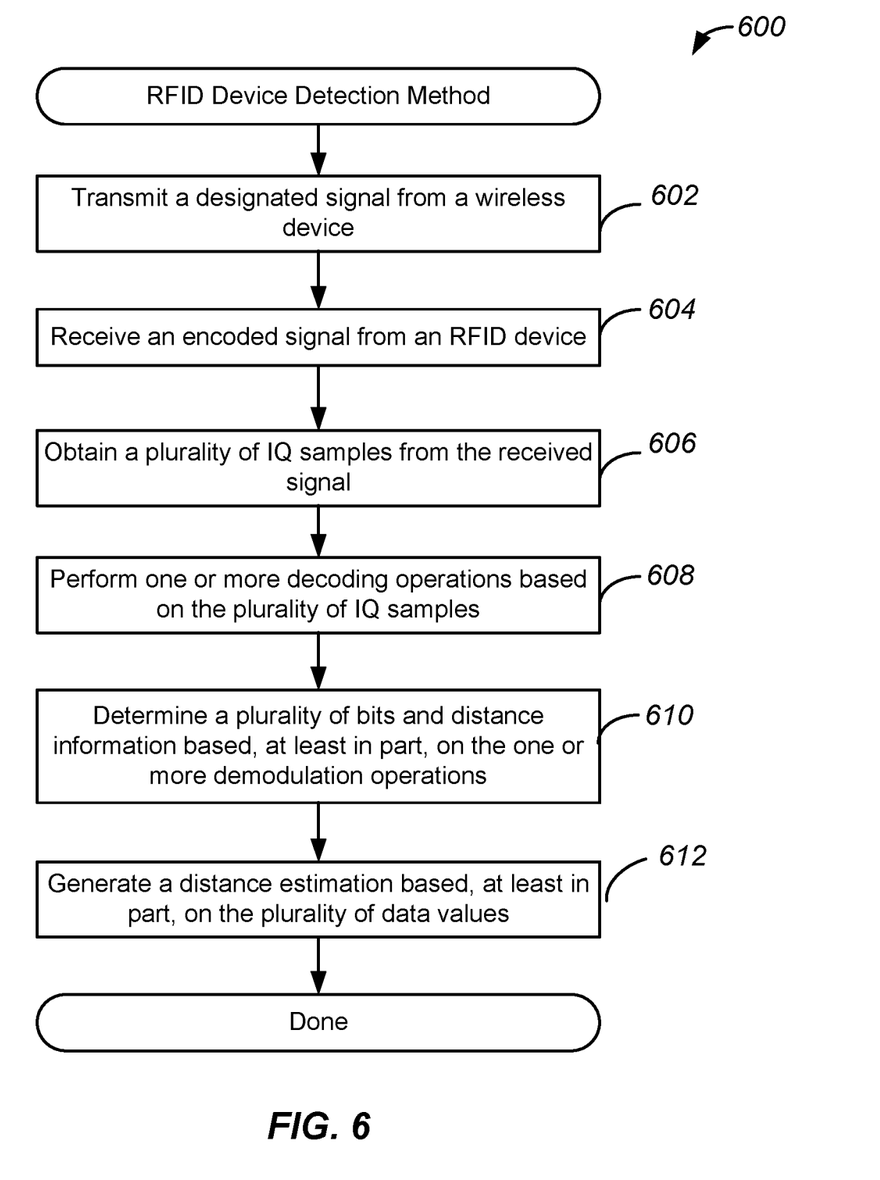
FIG. 6 illustrates a flow chart of another example of a method for radio frequency identification device detection, implemented in accordance with some embodiments.

FIG. 6 illustrates a flow chart of another example of a method for radio frequency identification device detection, implemented in accordance with some embodiments. As similarly discussed above, a method, such as method 600, may be performed to configure a wireless device to perform RFID device scanning and distance estimation operations. Accordingly, as will be discussed in greater detail below, the wireless device may use two collocated transceivers to transmit and receive signals as well as obtain various samples and measurements that may be used for RFID identification, receiving sensing information, and determining distance estimation.

Method 600 may perform operation 602 during which a designated signal may be transmitted from a wireless device. As similarly discussed above, the designated signal may be a predetermined signal that has been defined by an entity, such as a manufacturer. Accordingly, the designated signal may include a predetermined bit stream, and thus may include a known data pattern to the wireless device. The bit stream may be configured in accordance with a wireless communications protocol, and may have known frequency characteristics. Accordingly, during operation 602, a first transceiver of the wireless device may be configured as a transmitter, and may transmit the designated signal via a transmission medium.

Method 600 may perform operation 604 during which a signal including encoded information may be received from an RFID device. As similarly discussed above, the signal may be received at the RFID device, and the RFID device may reflect the signal in accordance with encoded information from the RFID device. As also discussed above, such encoded information may be determined based on frequency encoding, time domain encoding, or a combination of the two. In some embodiments, physical characteristics, such as a physical configuration and geometry, of the RFID device may be used for RFID encoding by filtering a reflected signal. Accordingly, the reflected signal may return the designated signal to the wireless device after encoding resulting from the reflection process.

Method 600 may perform operation 606 during which a plurality of IQ samples may be obtained from the received signal. Accordingly, a receiver of the wireless device may include an IQ capture unit that is configured to sample the received signal at a designated sampling frequency, and is further configured to obtain a plurality of measurements based on such samples. In various embodiments, the measurements may be IQ samples configured to measure in-phase and quadrature components of the received signal.

The IQ samples may be stored in memory for subsequent processing operations, as will be discussed in greater detail below.

Method 600 may perform operation 608 during which one or more decoding operations may be performed based on the plurality of IQ samples. In various embodiments, the decoding operations may be performed in accordance with decoding operations defined by a wireless communications protocol, and as performed by the PHY layer configured in accordance with the wireless communications protocol. Accordingly, the decoding operation used to process the IQ samples may defined by a wireless communications protocol, such as a Wi-Fi protocol. It will be appreciated that any suitable decoding technique may be used in accordance with any defined modulation/demodulation scheme.

Method 600 may perform operation 610 during which a plurality of bits and distance information may be determined based, at least in part, on the one or more decoding operations. Accordingly, as similarly discussed above, the received signal may be decoded to extract one or more data values from the received signal. As similarly discussed above, additional modulation may have been introduced by the RFID device in the form of time modulation, and the demodulation operations may be performed to, among other things, identify what time modulation has occurred as well as decode the transmitted bit stream included in the designated signal. As also discussed above, bits and distance information may be extracted based on filtered frequencies in a frequency domain.

Accordingly, during operation 610, one or more data values may be determined and may be used to identify the RFID device. For example, modulation parameters may be mapped to a particular RFID device identifier to identify that particular RFID device. Such a mapping may be stored and maintained at the wireless device to track known RFID devices. If no matching entry is already present in the mapping, a new entry may be generated during operation 610.

Method 600 may perform operation 612 during which a distance estimation may be generated based, at least in part, on the plurality of data values. In various embodiments, transceivers of the wireless device may be configured to include time stamp units that monitor when data was transmitted, and when data was received. In some embodiments, the transceivers may be synchronized to the same clock to ensure accuracy and synchronicity of the temporal measurements and determinations. Accordingly, during operation 612, a transmission time stamp may be obtained from the first transceiver corresponding to the transmission of the designated signal at operation 602. Moreover, a reception time stamp may be obtained from the second transceiver corresponding to the reception of the designated signal at operation 604. The transmission time stamp and the reception time stamp may be used to determine a time of flight. Moreover, the time of flight as well as known speed of propagation of the designated signal may be used to estimate a distance to the RFID device and determine an estimated distance value. In various embodiments, an equation, such as equation 1 shown below, may be used to determine an estimated distance. In equation 1, d is the estimated distance, c is the speed of light, and t is the time of flight determined based on the time stamp information.

$$d = \frac{c*t}{2} \quad (1)$$

In some embodiments, an equation, such as equation 2 shown below, may be used to determine an estimated distance. More specifically, equation 2 may be used for phase-based distance determination using phase changes in subcarriers of the received signal.

$$\Delta\phi_j = \frac{4\pi f_j d_1}{c} \quad (2)$$

Figure 7:
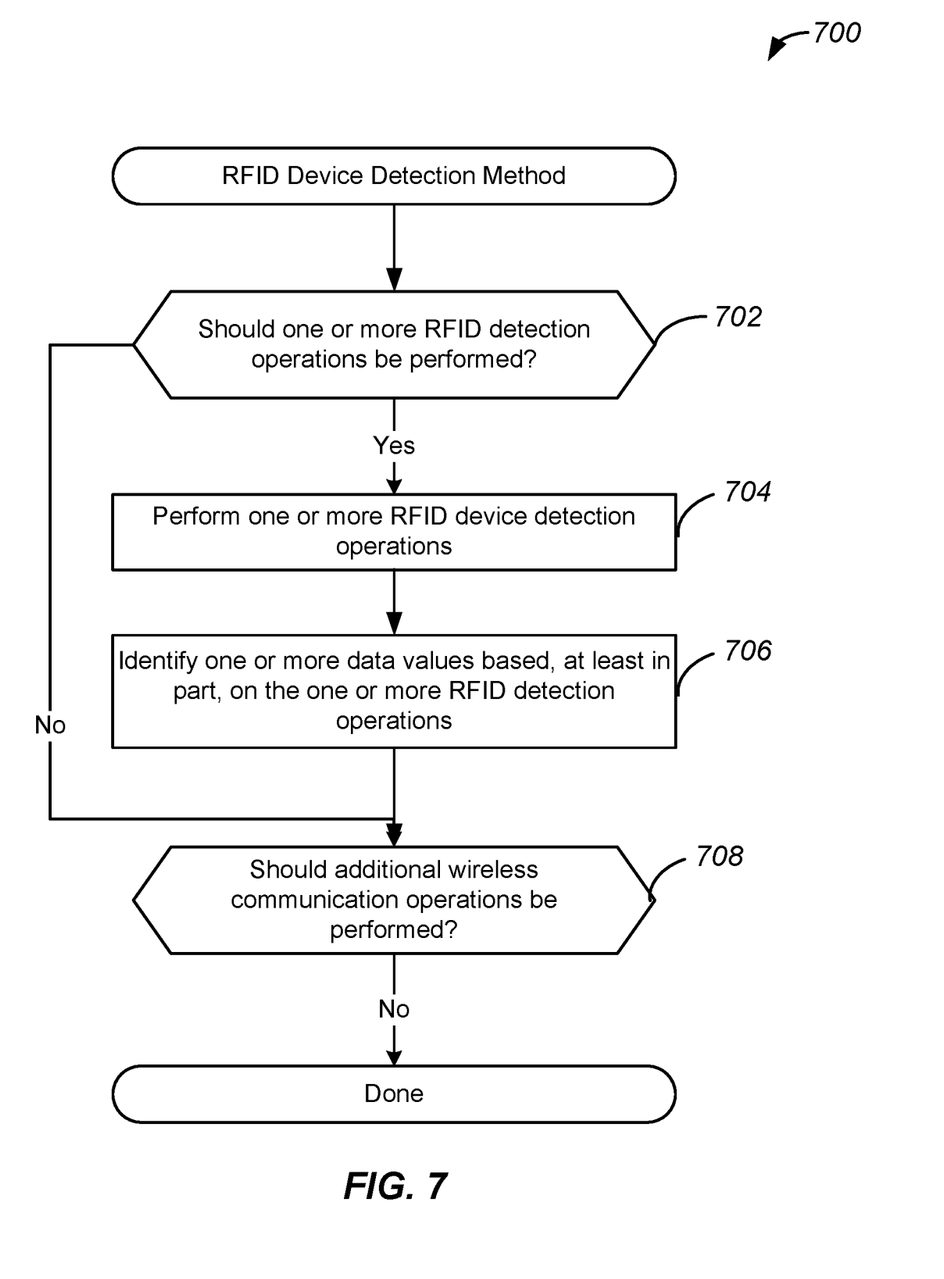
FIG. 7 illustrates a flow chart of an additional example of a method for radio frequency identification device detection, implemented in accordance with some embodiments.

FIG. 7 illustrates a flow chart of an additional example of a method for radio frequency identification device detection, implemented in accordance with some embodiments. As similarly discussed above, a method, such as method 700, may be performed to configure a wireless device to perform RFID device scanning and distance estimation operations. As similarly discussed above, the wireless device may be configured to perform wireless communication in accordance with a wireless communications protocol. Accordingly, as will be discussed in greater detail below, a method, such as method 700 may be performed to seamlessly switch between operational modes. For example, a wireless device may switch between a first operational mode used for wireless communications operations, such as transmission and reception of data packets, and a second operational mode used for RFID scanning operations, such as identification and security operations for RFID devices.

Method 700 may perform operation 702 during which it may be determined if one or more RFID detection operations may be performed. In various embodiments, such a determination may be made based on one or more events or conditions. For example, RFID detection operations may be performed periodically, and may be performed after a designated period of time has elapsed. In some embodiments, RFID detection operations may be performed dynamically, and may be performed in response to the occurrence of one or more events or conditions. For example, another system component, such as an application executed by a host processor, may provide an input that triggers such scanning operations. Thus, RFID detection operations may be triggered in response to an input received from an application that may be requesting such scanning operations. If it is determined that one or more RFID detection operations should not be performed, method 700 may proceed to operation 710. If it is determined that one or more RFID detection operations should be performed, method 700 may proceed to operation 706.

In various embodiments, one or more wireless communication operations may be performed prior to or in parallel with operation 702. As similarly discussed above, the wireless communication operations may include the transmission and reception of data packets in accordance with a wireless communications protocol, such as a Wi-Fi protocol. Accordingly, the wireless device may be in communication with one or more other wireless devices, and data packets and frames may be transmitted and received between the wireless devices over a wireless communications network. Therefore, wireless devices disclosed herein may be configured to perform RFID device scanning and distance estimation operations interleaved with or parallel to data packet transmission operations.

Accordingly, during operation 704, one or more RFID device detection operations may be performed. Accordingly, transceivers of the wireless device may be configured as a transmitter and a receiver, and a designated signal may be transmitted and received as described above. Moreover, various identification and estimated distance computations may also be performed. In this way, during operation 704, the wireless device may be configured as an RFID scanner, and one or more RFID device detection and distance operations may be performed to identify an RFID device, and perform security operations associated with the RFID device.

Method 700 may perform operation 706 during which one or more data values may be identified based, at least in part, on one or more RFID detection operations. As similarly discussed above, the one or more data values may be a decoded bit stream that is extracted from the received signal. In this way, the data values may be identified and stored, and utilized for the computations and operations discussed above.

Method 700 may perform operation 708 during which it may be determined if additional wireless communication operations should be performed. In various embodiments, such a determination may be made in response to one or more conditions or events. For example, in response to RFID detection operations completing, the wireless device may, by default, return to wireless communication operations such as the transmission and reception of data packets described above. In another example, the wireless device may return to wireless communication operations in response to the passage of a designated amount of time. If it is determined that additional wireless communication operations should be performed, method 700 may return to operation 702. If it is determined that additional wireless communication operations should not be performed, method 700 may terminate.

Figure 8:
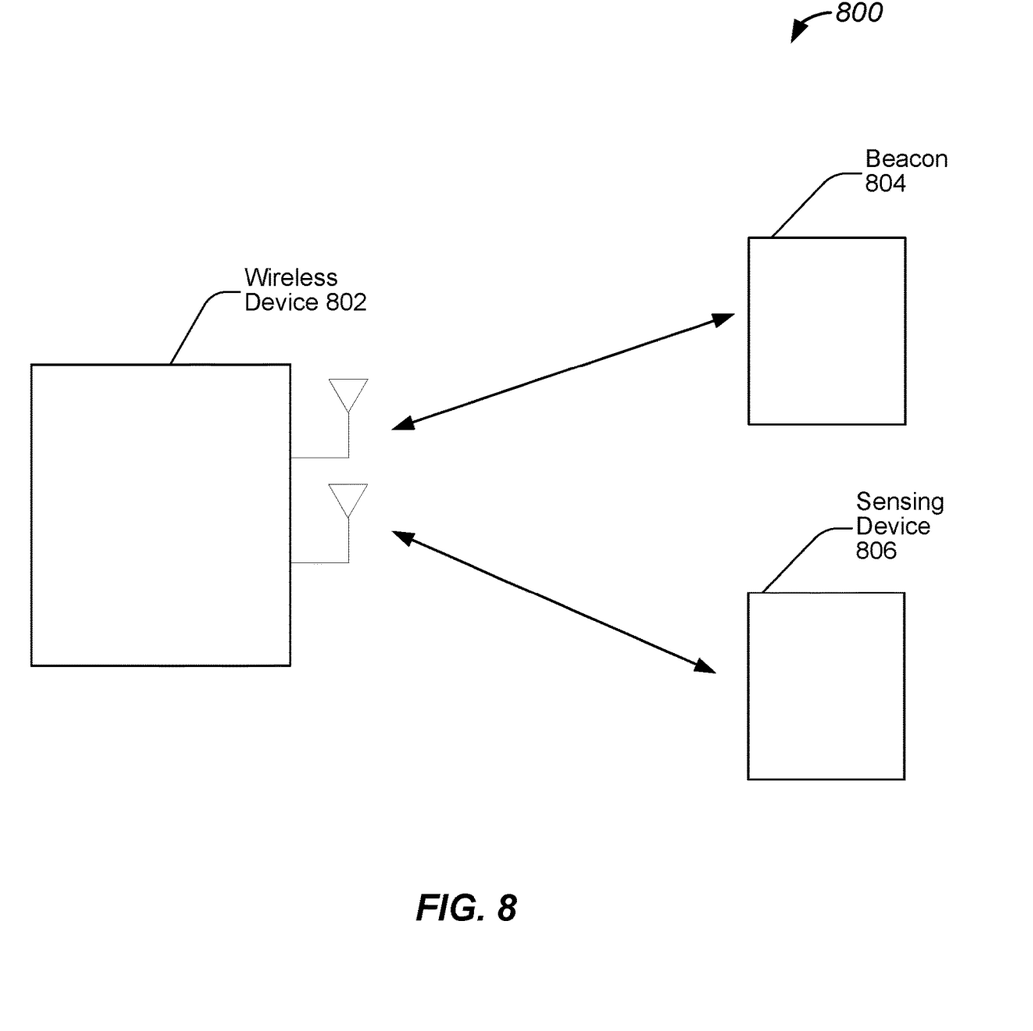
FIG. 8 illustrates an example of an additional system for radio frequency identification device detection, configured in accordance with some embodiments.

FIG. 8 illustrates an example of an additional system for radio frequency identification device detection, configured in accordance with some embodiments. In various embodiments, a system, such as system 800, may be configured to utilize wireless devices for RFID scanning to enable one or more operations, such as localization or sensing. As will be discussed in greater detail below, RFID devices may be configured as beacon tags as well as sensing tags to facilitate such operations.

In various embodiments, system 800 includes wireless device 802 which may be a mobile device. For example, wireless device 802 may be a smartphone or other smart device. Accordingly, wireless device 802 may be operated by a user, and may include one or more processors configured to run various software applications. For example, wireless device 802 may support one or more applications that utilize location services to identify the user's location. Moreover, wireless device 802 may be configured to implement the wireless communication and RFID scanning operations previously discussed above.

System 800 additionally includes beacon 804 which may be an RFID tag that is associated with a particular location. For example, RFID tag may be placed in a known location, and may have an RFID identifier that is used to identify that location. Thus, according to various embodiments, when beacon 804 is scanned by wireless device 802 in accordance with the scanning operations discussed above, wireless device 802 may identify that it is within a designated distance of the identified location.

System 800 further includes sensing tag 806 which may be an RFID tag that is configured to perform one or more sensing operations. Accordingly, sensing tag 806 may be configured to detect one or more environmental conditions, such as a change in temperature, pressure, impedance, or some measure of resistance or conductance. In one example, sensing tag 806 may be included in a capacitive touch panel, and may be used to identify a change in operation of the touch panel, such as damage to the electrodes of the touch panel. Accordingly, such sensed information may be provided to wireless device 802 via a wireless communications channel as discussed above.

In another example, sensing tag 806 may be an additional RFID tag placed at an additional known location, and may have an additional RFID identifier that is used to identify that additional location. Accordingly, the identification of beacon tag 804 and sensing tag 806 may be used to further localize a location of wireless device 802 and its associated user. While FIG. 8 illustrates two RFID tags, it will be appreciated that any suitable number may be included in system 800. Accordingly, several additional RFID tags may be included to facilitate precise localization of wireless device 802. For example, another RFID tag may be included in system 800 to enable triangulation of the position of wireless device 802.

Figure 9:
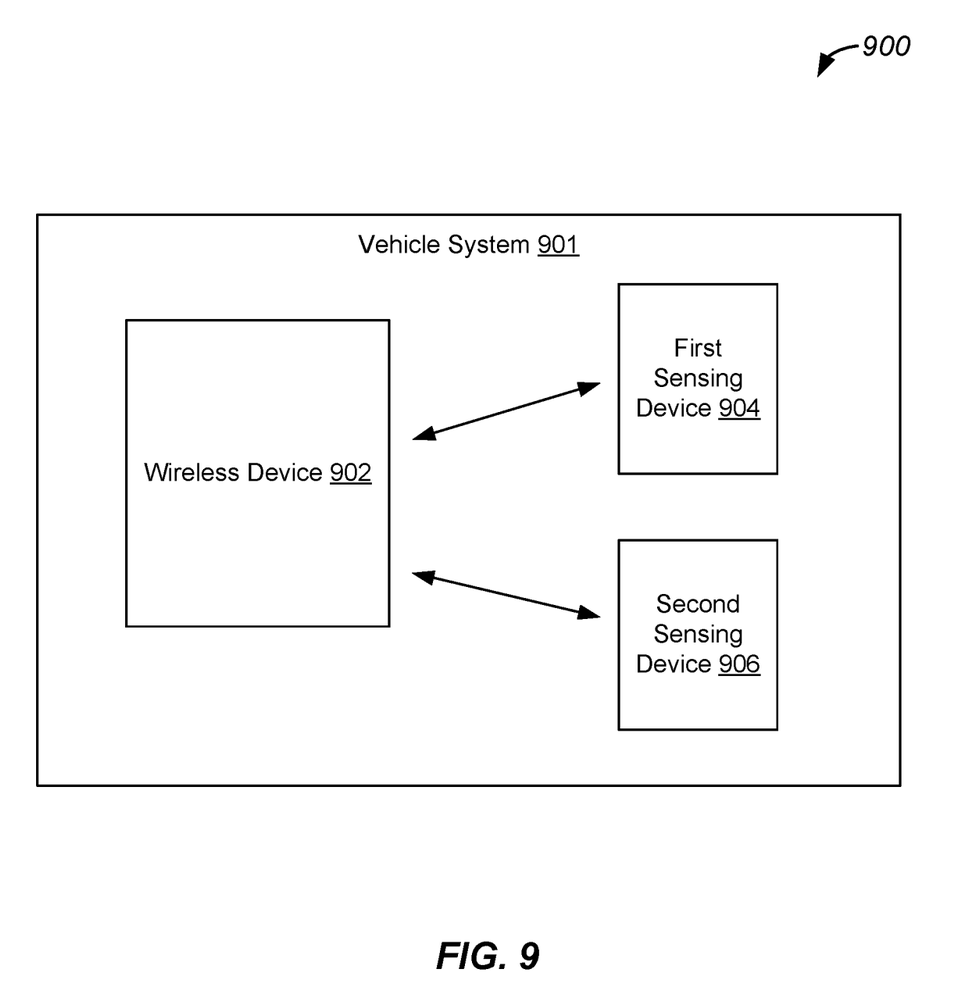
FIG. 9 illustrates an example of another system for radio frequency identification device detection, configured in accordance with some embodiments.

FIG. 9 illustrates an example of another system for radio frequency identification device detection, configured in accordance with some embodiments. In various embodiments, a system, such as system 900, may be configured to utilize wireless devices for RFID scanning to enable one or more operations, such as sensing operations and system status determinations. As will be discussed in greater detail below, RFID devices may be configured as beacon tags as well as sensing tags to facilitate such operations.

In various embodiments, system 900 includes vehicle system 901 which may be an onboard system of a vehicle, such as an automobile. Accordingly, vehicle system 901 may include one or more onboard computing components of the vehicle, such as one or more processors of an infotainment system. In various embodiments, vehicle system 901 further includes other components of the vehicle, such as interior restraint systems, such as seatbelts. Vehicle system 901 may additionally include diagnostic components installed by the manufacturer in the vehicle.

In various embodiments, vehicle system 901 may be communicatively coupled to one or more wireless devices, such as wireless device 902. As similarly discussed above, wireless device 902 may be a smartphone or other smart device. Accordingly, wireless device 902 may be operated by a user, and may include one or more processors configured to run various software applications. Moreover, wireless device 902 may be configured to implement the wireless communication and RFID scanning operations previously discussed above.

System 900 additionally includes first sensing device 904 which may be an RFID tag configured to detect one or more conditions associated with vehicle system 901. For example, first sensing device 904 may be installed in a seat belt buckle, and may identify whether or not a seatbelt is buckled based on an amount of pressure applied to first sensing device 904, as may be the case when a seatbelt is buckled and interior components of the buckle are depressed. Such pressure changes may be provided to wireless device 902 to identify to wireless device 902 that the seatbelt is buckled, as may be identified based on the identifier of first sensing device 904 as well as its sensing information. Wireless device 902 may provide this information to an external entity via a WiFi or cellular network. For example, such information may be provided to one or more servers operated by a state regulatory agency. In some embodiments, the information may be provided to one or more components of vehicle system 901. In this way, wireless device 902 may be used to detect and convey sensed information from the vehicle environment to one or more entities, such as external servers or components of the vehicle itself. In various embodiments, components of vehicle system 901 may be configured to perform such sensing operations. Accordingly, wireless components of, for example, an infotainment system, may be used to retrieve sensed information from first sensing device 904.

System 900 further includes second sensing device 906 which may be an additional RFID tag that may be used for additional sensing information. In one example, second sensing device 906 may be a sensing tag installed in a seat of the vehicle. Accordingly, second sensing device 906 may return sensed information identifying pressure changes representative of whether or not a user is sitting in a seat associated with the seatbelt buckle in which first sensing device 904 is installed. Accordingly, wireless device 902 may use a combination of sensed information from first sensing device 904 and second sensing device 906 to determine if a user is sitting in the seat, and if the seatbelt is buckled. As discussed above, such a determination may be provided to an external entity, or one or more other components of vehicle system 901. It will be appreciated that while FIG. 9 illustrates first sensing device 904 and second sensing device 906, any suitable number of sensing devices may be included in system 900 for various different sensing operations associated with vehicle system 901.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   transmitting a signal from a transmitter of a wireless device;
   receiving, using a receiver of the wireless device, an encoded signal from a radio frequency identification (RFID) device, the transmitter and receiver being configurable to be compatible with a wireless communications protocol used for data transmission over a wireless network;
   removing, using a phase shifter, a parasitic signal from the received modulated signal;
   determining a plurality of data values based, at least in part, on the received encoded signal; and
   generating an estimated distance value based, at least in part, on the received encoded signal, the estimated distance value representing an estimate of a distance between the wireless device and the RFID device.

2. The method of claim 1, wherein the RFID device is a passive device.

3. The method of claim 2, wherein the encoded signal is generated based on backscattering of the signal by the RFID device.

4. The method of claim 1 further comprising:
   obtaining a plurality of samples from the received modulated signal; and
   performing one or more decoding operations based, at least in part, on the plurality of samples, the one or more decoding operations comprising comparing the received signal with the transmitted signal.

5. The method of claim 4, wherein the one or more decoding operations decode a bit stream from the encoded signal, and wherein the bit stream comprises an identifier for the RFID device.

6. The method of claim 1 further comprising:
   switching the transmitter from a first operational mode to a second operational mode, the first operational mode being used for data transmission in accordance with the wireless communications protocol, and the second operational mode being used for scanning associated with the RFID device.

7. The method of claim 1, wherein the wireless communications protocol is an institute of electrical and electronics engineers (IEEE) 802.11 protocol.

8. The method of claim 1, wherein the wireless communications protocol is a Bluetooth Low Energy (BLE) protocol.

9. A system comprising:
   a transmitter configured to transmit a signal;
   a receiver configured to receive an encoded signal from a radio frequency identification (RFID) device, the transmitter and receiver being configurable to be compatible with a wireless communications protocol used for data transmission over a wireless network; and
   a processing device coupled to the transmitter and the receiver and configured to:
      determine a plurality of data values based, at least in part, on the received encoded signal;
      remove, using a phase shifter, a parasitic signal from the received modulated signal; and
      generate an estimated distance value based, at least in part, on the received encoded signal, the estimated distance value representing an estimate of a distance between a wireless device and the RFID device.

10. The system of claim 9, wherein the RFID device is a passive device, and wherein the encoded signal is generated based on backscattering of the signal by the RFID device.

11. The system of claim 9, wherein the processing device is further configured to:
    obtain a plurality of samples from the received encoded signal; and
    perform one or more decoding operations based, at least in part, on the plurality of samples, the one or more decoding operations comprising comparing the received signal with the transmitted signal.

12. The system of claim 11, wherein the one or more decoding operations decode a bit stream from the encoded signal, and wherein the bit stream comprises an identifier for the RFID device.

13. The system of claim 9, wherein the wireless communications protocol is an IEEE 802.11 protocol.

14. The system of claim 9, wherein the wireless communications protocol is a BLE protocol.

15. A device comprising:
    processing elements configured to:
       generate a signal transmitted from a transmitter of a wireless device;
       receive, using a receiver of the wireless device, an encoded signal from a radio frequency identification (RFID) device, the transmitter and receiver being configurable to be compatible with a wireless communications protocol used for data transmission over a wireless network;
       remove, using a phase shifter, a parasitic signal from the received modulated signal;
       determine a plurality of data values based, at least in part, on the received encoded signal; and
       generate an estimated distance value based, at least in part, on the received encoded signal, the estimated distance value representing an estimate of a distance between the wireless device and the RFID device.

16. The device of claim 15, wherein the RFID device is a passive device, and wherein the encoded signal is generated based on backscattering of the signal by the RFID device.

17. The device of claim 15, wherein the processing elements are further configured to:
   obtain a plurality of samples from the received encoded signal; and
   perform one or more decoding operations based, at least in part, on the plurality of samples, the one or more decoding operations comprising comparing the received signal with the transmitted signal.

18. The device of claim 15, wherein the wireless communications protocol is an IEEE 802.11 protocol.

19. The device of claim 15, wherein the wireless communications protocol is a BLE protocol.

* * * * *